(12) United States Patent
Flogard

(10) Patent No.: US 6,840,560 B2
(45) Date of Patent: Jan. 11, 2005

(54) VEHICULAR SEAT ASSEMBLY HAVING A MOVABLE HEADREST AND A VEHICLE WHICH INCORPORATES THE VEHICULAR SEAT ASSEMBLY

(75) Inventor: Anders Flogard, Frandefors (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,780

(22) Filed: Feb. 18, 2003

(65) Prior Publication Data

US 2004/0160094 A1 Aug. 19, 2004

(51) Int. Cl.[7] .............................................. B60N 2/42
(52) U.S. Cl. ........................... 296/68.1; 297/216.12; 296/187.11
(58) Field of Search .......................... 297/216.12, 408; 296/68.1, 65.02, 65.01; 280/751

(56) References Cited

U.S. PATENT DOCUMENTS

| | | | | |
|---|---|---|---|---|
| 3,310,342 A | * | 3/1967 | Drelichowski | 280/751 |
| 3,838,870 A | * | 10/1974 | Hug | 297/472 |
| 4,249,754 A | * | 2/1981 | Best | 280/751 |
| 4,756,551 A | * | 7/1988 | Miller | 280/751 |
| 5,273,336 A | * | 12/1993 | Schubring et al. | 296/65.17 |
| 5,378,043 A | | 1/1995 | Viano | |
| 5,795,019 A | * | 8/1998 | Wieclawski | 297/216.14 |
| 6,019,424 A | | 2/2000 | Ruckert et al. | |
| 6,022,074 A | | 2/2000 | Swedenklef | |
| 6,024,405 A | | 2/2000 | Charras et al. | |
| 6,033,018 A | * | 3/2000 | Fohl | 297/216.13 |
| 6,050,637 A | | 4/2000 | Haland et al. | |
| 6,062,642 A | | 5/2000 | Sinhuber et al. | |
| 6,109,689 A | * | 8/2000 | Nanni | 297/216.1 |
| 6,135,561 A | * | 10/2000 | Kruger et al. | 297/408 |
| 6,385,517 B1 | * | 5/2002 | Kore | 701/45 |
| 6,416,125 B1 | * | 7/2002 | Shah et al. | 297/216.12 |
| 6,478,373 B1 | * | 11/2002 | Hake et al. | 297/216.13 |

* cited by examiner

Primary Examiner—Peter M. Cuomo
Assistant Examiner—Stephen D'Adamo
(74) Attorney, Agent, or Firm—Gary A. Smith

(57) ABSTRACT

A low profile vehicular seat having an occupant contacting surface and a headrest which is moved from a first position to a second head reception position upon the communication of force from the body of the vehicle to the seat assembly.

14 Claims, 3 Drawing Sheets

VEHICULAR SEAT ASSEMBLY HAVING A MOVABLE HEADREST AND A VEHICLE WHICH INCORPORATES THE VEHICULAR SEAT ASSEMBLY

BACKGROUND OF INVENTION

1. Field of the Invention

The invention generally relates to a vehicular seat assembly having a selectively movable headrest and to a vehicle which incorporates the seat assembly and, more particularly, to a low profile vehicular seat assembly which is coupled to the body of a vehicle and, in response to a force which is communicated to the vehicular seat assembly from the vehicular body, moves the headrest assembly from a first position to a second head reception position.

2. Background of the Invention

A vehicular seat typically includes a headrest assembly having a headrest adapted to provide support to the head of the occupant of the seat. Particularly, many of these headrests are selectively movable toward the occupant when the occupant exerts a certain amount of force against the seat (i.e., against the occupant contacting surface of the seat). Such a force typically occurs in a rear impact type of vehicular collision and such headrest movement is effective to allow these headrests to more effectively prevent neck and/or spinal column injuries (commonly known as "whiplash") such as may occur during a severe impact. While these prior seat and headrest assemblies do allow for selective headrest movement, they suffer from some drawbacks.

By way of example, each of these prior headrest assemblies typically include a plate and/or spring assembly which is operatively disposed within these seats (e.g., just below the occupant contacting surface) and which, when forcibly contacted by the occupant of the seat, causes these headrest assemblies to move in the desired manner.

particularly, such a deployed plate and spring assembly undesirably increases the width of the vehicular seat in which it is disposed, thereby reducing the amount of space within the passenger compartment, preventing the seat from folding, and causing the seat to provide a relatively unesthetically pleasing overall appearance. Moreover, oftentimes the headrest is inadvertently and undesirably moved due to the placement of heavy packages against the spring and plate assembly or due to children or animals playing on the seat. Further, while it is desirable to have the headrest move very shortly after vehicular impact has occurred, the present configuration is not typically activated until a relatively long time has passed after such vehicular impact has occurred (e.g., until the occupant is actually "forced" into the occupant contacting surface of the seat). That is, in these prior configurations, the headrest is only actuated after the occupant has first compressed a certain amount of seat material (e.g., such as foam) as the occupant forcibly contacts the seat, thus undesirably lengthening the headrest "actuation time" (i.e., the time between the occurrence of the impact and the initiation of movement of the headrest). The present invention overcomes these drawbacks in a new and novel manner.

SUMMARY OF INVENTION

It is an objective of the present invention to provide a vehicular seat assembly which overcomes some or all of the previously delineated drawbacks of prior vehicular seat assemblies. It is a second objective of the present invention to provide a low profile vehicular seat assembly which overcomes some or all of the previously delineated drawbacks of prior vehicular seat assemblies and which may be easily folded and which has an aesthetically pleasing overall appearance.

It is a third objective of the present invention to provide a low profile vehicular seat assembly which overcomes some or all of the previously delineated drawbacks of prior vehicular seat assemblies and which includes a selectively movable headrest which is moved only upon receipt of a predetermined amount of force applied to the seat assembly from the body of the vehicle, thereby reducing the likelihood that the headrest will undesirably and inadvertently move.

It is a fourth objective of the present invention to provide a vehicular seat assembly comprising a seat portion; a backrest portion; and a headrest assembly having a headrest which is movably coupled to the backrest portion, the headrest assembly further having a mechanical linkage which senses an impact, and which moves the headrest assembly from a first position to a second head reception position in response to the sensed impact.

It is a fifth objective of the present invention to provide a vehicular seat assembly comprising a backrest portion; a headrest; a pivot member coupled to the headrest and rotatably disposed within the backrest portion; a first arm extending from the pivot member and having a free end connectable to a portion of a vehicle body such that rearward motion of the backrest portion relative to the portion of the body applies a moment to the pivot member, said moment urging the headrest toward said head reception position.

It is a sixth objective of the present invention to provide a vehicle. Particularly, the vehicle comprises a body; at least one low profile seat which is disposed within the body and having a backrest, the at least one low profile seat further having a selectively movable headrest and mechanical linkage operatively contained within the at least one low profile seat and coupled to the selectively movable headrest, the mechanical linkage moving the headrest to a head reception position after receiving a certain amount of force applied to the linkage from a portion of the vehicular body. These and other features and objectives of the present invention will become apparent from a consideration of the following claims and by reference to the following drawings in combination with the detailed description of the preferred embodiment of the invention.

DETAILED DESCRIPTION

Figure 1:
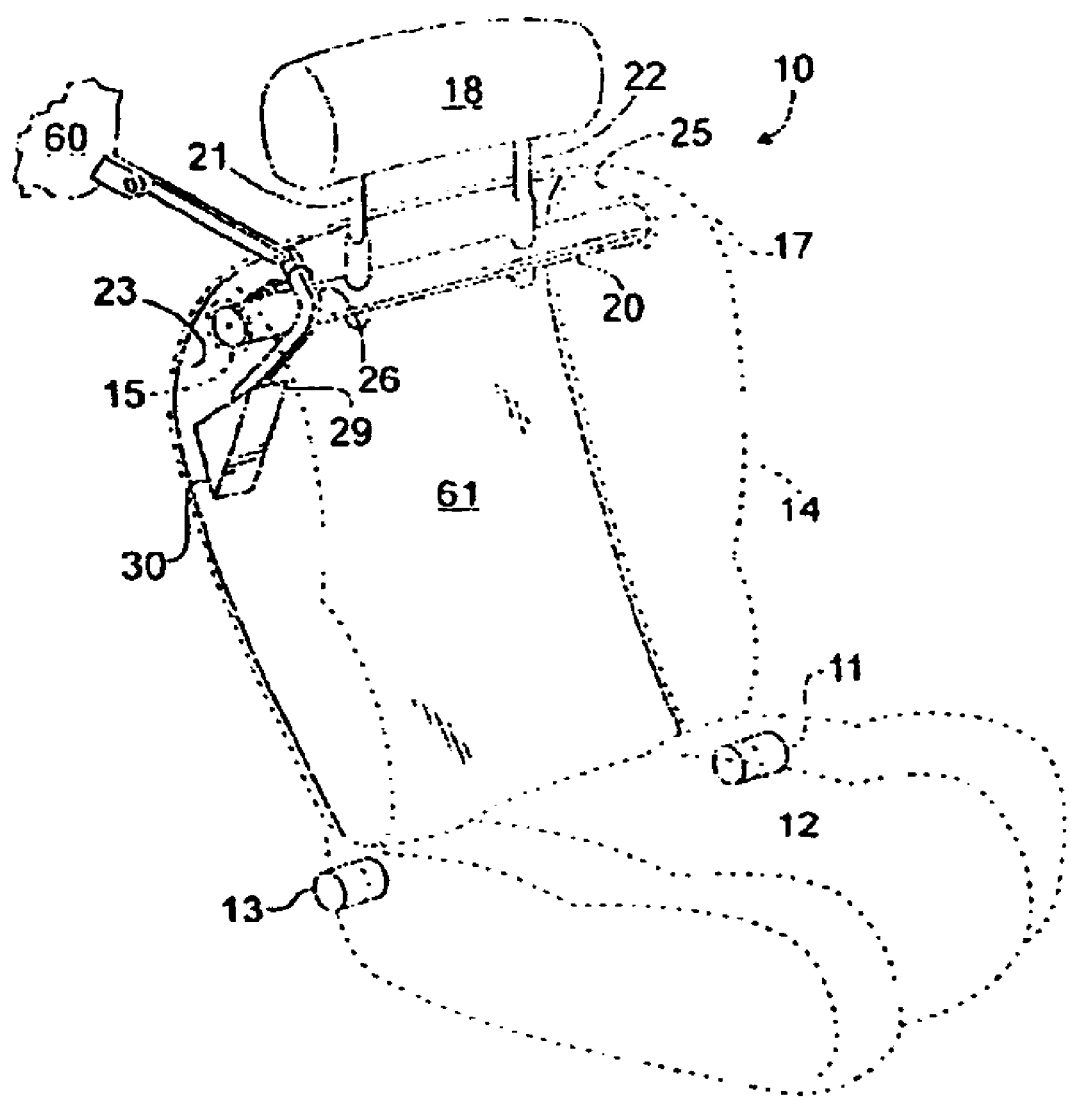
FIG. 1 a perspective view of a vehicular seat assembly which is made in accordance with the teachings of the preferred embodiment of the invention.
Figure 2:
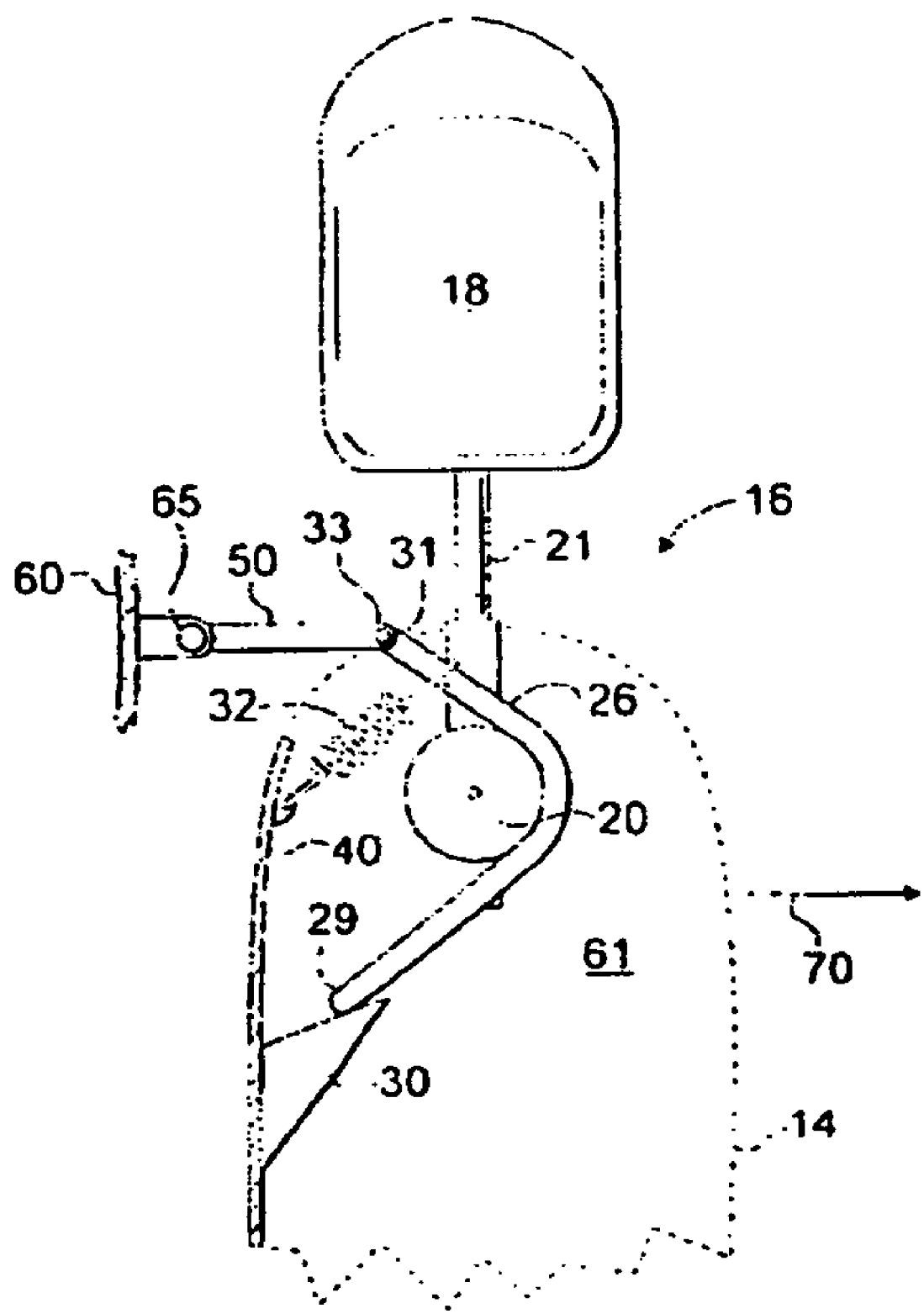
FIG. 2 is a side view of the vehicular seat assembly shown in FIG. 1 in a normal operating position.

Referring now to FIGS. 1 and 2, there is shown a vehicular seat assembly 10 made in accordance with the teachings of the preferred embodiment of the invention.

Particularly, the vehicular seat assembly 10 includes a relatively thin and low profile seat portion 12 and a relatively thin and low profile back support portion 14 which may be movably coupled to the seat portion 12 by conventional hinges 11, 13, thereby allowing the back support portion 14 to tilt or rotate rearward with respect to seat portion 12. Hinges 11, 13 may also allow back portion 14 to be selectively folded forward and placed upon seat portion 12. It should be understood that the term "low profile", when applied to the seat assembly 10, means that the width of the portions 12, 14 are substantially similar to a vehicular seat that does not include a head rest movement assembly.

As is further shown, the vehicular seat assembly 10 includes a headrest assembly 16 which includes a headrest 18, a pivot member 20 which is rotatably disposed within the back portion 14, and posts 21, 22 which are each received within the headrest 18 and within the pivot member 20 and which are effective to couple the headrest 18 to the pivot member 20. By way of example and without limitation, the pivot member 20 may be rotatably supported by indentations 15, 17 which are respectively formed in or on the surfaces 23, 25 of the back support portion 14.

Further, as shown, the vehicular seat assembly 10 includes a first arm 26 extending upward and rearward from the pivot member 20 and a second arm 29 extending downward and rearward. A stop 30 is attached to the interior surface 40 of the rear of backrest portion 14 and abuttingly engages the end of second arm 29. The vehicular seat assembly 10 further includes a biasing spring 32 which is coupled to the first arm 26 and to the interior surface 40 of the backrest portion 14, and a linkage member 50 which is coupled to the body 60 of the vehicle by a conventional fastener assembly 65 (e.g., a nut and a bolt) and which is coupled to the free end 31 of the first arm 26 by a conventional fastener assembly 33, such as a pin and clevis assembly.

It should be appreciated that this invention is not limited to a specific size or a specific shape of a occupant seat, including that which is described above and illustrated in FIGS. 1 and 2. Rather, the present invention may be utilized or employed in a vehicular seat of any desired shape and any desired size. For example and without limitation, this invention may be utilized in a rear passenger "bench" type seat that includes two or more head rests (i.e., a seat which provides a separate headrest for each of two or more passengers).

In normal operation of the vehicle, the headrest 18 is maintained in a "normal" rearward or upright position, as is shown in the FIGS. 1 and 2, by the cooperative arrangement of members 20, 21, 22, 26, 32, and 50. That is, the pivot member 20 is "fixed" or stationarilly positioned relative to the backrest portion 14 due to the engagement of the stop 30 with the end of lower arm 29 and due to the coupling of the end of upper arm 26 to the vehicular body 60 by the member 50. The biasing spring 32 further ensures that the pivot member 20 is "fixed" in the rearward position shown in FIGS. 1 and 2.

Figure 3:
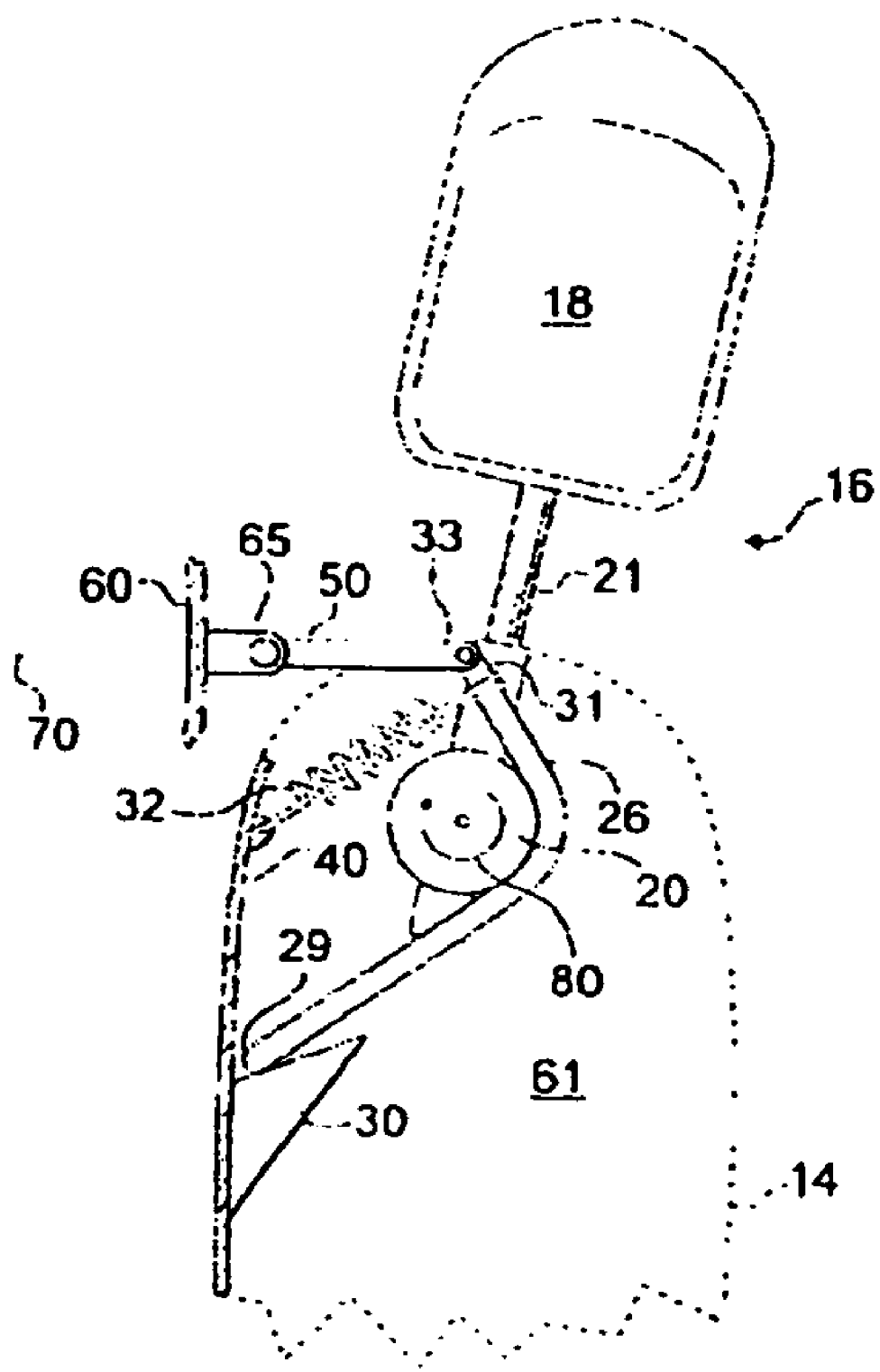
FIG. 3 is a side view of the vehicular seat assembly shown in FIG. 2 in a forward position.

Upon the occurrence of a rear impact or other type of collision applying a sudden, forwardly directed force to the vehicle, the body 60 is urged forwardly while the back portion 14, because of its inertia, resists forward movement. This causes the upper end of the back portion 14 to move rearward relative to body 60, rotating in a counterclockwise direction (as viewed in FIGS. 1–3) about hinges 11, 13. As this relative movement takes place, the force of the impact on the body 60 is transmitted from the body 60 through the member 50 to the upper arm 26. This action urges the free end 31 of upper arm 26 to move forwardly against the biasing force of the spring 32, thereby applying a turning moment to the pivot member 20 causing it to rotate in a clockwise direction 80 and to move the headrest 18 in the forward direction 70 toward a head reception position, as shown in FIG. 3. In this manner, the assembly 16 "senses" the force or impact upon the body 60 of the vehicle and the desired forward headrest movement is achieved without the need for and in the absence of reaction forces being applied to the occupant contacting surface 61 of portion 14 by the body of a seat occupant.

It should be understood that nothing in this description is meant to limit the movement of headrest 18 to rotational movement. Rather, the previously delineated rotational movement of the headrest 18 (i.e., of pivot member 20) is but one example of the type of movement which may be employed to move the headrest 18. For example and without limitation, in one alternate embodiment of the invention, a headrest assembly may selectively actuate the headrest 18 by the use of linear motion. It should be appreciated that such "sensing", without the need for force to be imparted upon the occupant contacting surface 61, allows the headrest assembly 16 to begin moving the headrest 18 to a head reception position before the occupant begins to move rearward relative to the seat portion 14.

It should be appreciated that different types of springs may be used in cooperation with spring 32 or in place of spring 32, each respective spring having a unique stiffness. It should be further appreciated that there exists a direct relationship between the stiffness of spring 32 and the amount of force required to move the headrest 18 in the direction 70. Thus, prudent selection of a spring allows a vehicle designer to select the amount of impact force required to move the headrest 18. Further, since no force is necessary to be imparted to the occupant contacting surface 61 of portion 14, the likelihood of an inadvertent and undesired headrest movement is minimized.

Moreover, it should also be appreciated that while no force is necessary to be imparted to the occupant contacting surface 61 in order to move the headrest 18, any such force which may actually be imparted upon surface 61 (e.g., by an occupant) only further aids the actuation or the movement of the headrest 18 to the head reception position, thereby allowing for an even faster response time for the placement of the headrest 18 to the head reception position to be realized (i.e., the combined inertia of the occupant's body and the seat portion 14 cause the upper arm 26 to move faster, thereby aiding in the counteracting of the force of the biasing spring 32). Further, the headrest assembly 16 is relatively compact, thereby allowing the backrest portion 14 to be relatively thin and providing a relatively pleasant overall aesthetic appearance and allowing the portion 14 to be easily folded onto portion 12. Further, the headrest portion 18 of headrest assembly 16 may be easily removed from the seat portion 14. (i.e., the posts 21, 22 may be easily "lifted" from the pivot member 20). Moreover, after the headrest 18 moves to the extended position, it may be manually "pushed" back to the original position shown in FIGS. 1 and 2. Alternatively, the spring 32 may have sufficient stiffness to cause the headrest 18 to move back to the original position shown in FIGS. 1 and 2 after the impact force is dissipated. Moreover, a conventional damper assembly may be used to limit the speed of amount of the headrest 18 through all or a portion of its range of movement.

It should be understood that the invention is not limited to the exact construction or method which has been delineated above, but that various changes and modifications may be made without departing from the spirit and the scope of the inventions are delineated to the following claims.

What is claimed is:

1. A vehicular seat assembly comprising:
a seat portion;

a backrest portion;

a headrest assembly having a headrest movably coupled to the backrest portion; and a mechanical linkage coupled to the headrest assembly and to a vehicle body, the mechanical linkage including:

a pivot member coupled to the headrest and rotatably mounted to the backrest portion;

a first arm extending from the pivot member and having a first end; and a linkage member pivotally connected to the first end of the first arm and connectable to a portion of the vehicle body;

wherein the mechanical linkage transmits a force from the vehicle body to the headrest assembly to move the headrest assembly from a first position to a second head reception position in response to a vehicle impact such that rearward motion of the backrest portion relative to the portion of the vehicle body applies a moment to the pivot member, the moment urging the headrest toward the second head reception position.

2. The vehicular seat assembly of claim 1 wherein said headrest moves to said second head reception position along a direction that extends away from the vehicle impact.

3. The vehicular seat assembly of claim 1 wherein said mechanical linkage further comprises a second arm extending from said pivot member and engaging a stop secured to said backrest portion to prevent rotation of the pivot member in a direction opposite that in which said moment is applied.

4. The vehicular seat assembly of claim 3 wherein the stop is attached to an interior surface of the backrest portion.

5. The vehicular seat assembly of claim 3 wherein the stop has a triangular cross section.

6. The vehicular seat assembly of claim 1 further comprising a biasing spring coupled to said mechanical linkage to urge the headrest toward the first position.

7. A vehicular seat assembly comprising:

a backrest portion;

a headrest;

a pivot member coupled to said headrest and rotatably mounted to said backrest portion;

a first arm extending from said pivot member and having a first end connectable to a vehicle body such that movement of said backrest rearward relative to said vehicle body exerts a force on said first arm urging said pivot member to rotate in a first direction corresponding to a forward position of said headrest; and a second arm extending from said pivot member and having a free end engaging a stop disposed within said backrest portion to position said headrest in a rearward position and restrain the pivot member against rotation in a first direction corresponding to further rearward movement of the headrest;

wherein the first arm and the second arm are formed as a unitary "V" shaped member.

8. The vehicular seat assembly of claim 7 further comprising a biasing spring coupled to said first arm and to said backrest portion to urge the headrest toward the first position.

9. The vehicular seat assembly of claim 7 wherein said pivot member comprises a generally round and elongated member having opposed ends which respectively are rotatably received in a unique one of a pair of indentations formed within said backrest portion.

10. The vehicular seat assembly of claim 7 further comprising a linkage member coupled to said first arm and to said portion of said vehicle.

11. The vehicle seat assembly of claim 7 further comprising a seat portion and wherein said backrest portion is moveably coupled to said seat portion.

12. A vehicle comprising:

a body;

at least one low profile seat disposed within said body and having a backrest;

a headrest mounted to said backrest and movable relative to said backrest between a first position and a head reception position; and a mechanical linkage coupling said headrest assembly to said body, said mechanical linkage including:

a pivot member coupled to said headrest and rotatably mounted to said backrest:

a first arm extending from said pivot member and having a first end; and a linkage member pivotally connected between said first end of said first arm and said body;

wherein the mechanical linkage transmits a force from said body to said headrest assembly to move said headrest from said first position to said head reception position in response to a vehicle impact such that rearward motion of said backrest portion relative to said body applies a moment to said pivot member, said moment urging said headrest toward said reception position.

13. The vehicle of claim 12 wherein said mechanical linkage further comprises a second arm extending from said pivot member and engaging a stop secured to said backrest to prevent rotation of the pivot member in a direction opposite that is which said moment is applied.

14. The vehicle of claim 12 wherein said mechanical linkage comprises a biasing spring urging said backrest toward said first position.

* * * * *